(12) United States Patent
Parmaningsih

(10) Patent No.: US 8,556,096 B2
(45) Date of Patent: Oct. 15, 2013

(54) CONTAINER LID HAVING A PULLING PART AND A BREAKABLE CONNECTING PART

(75) Inventor: S.E. Parmaningsih, Jakarta Timur (ID)

(73) Assignee: Pt. Aqua Golden Mississippi TBK., Jakarta (ID)

( * ) Notice: Subject to any disclaimer, the term of this patent is extended or adjusted under 35 U.S.C. 154(b) by 0 days.

(21) Appl. No.: 13/319,354

(22) PCT Filed: May 12, 2010

(86) PCT No.: PCT/IB2010/001090
§ 371 (c)(1),
(2), (4) Date: Nov. 8, 2011

(87) PCT Pub. No.: WO2010/131100
PCT Pub. Date: Nov. 18, 2010

(65) Prior Publication Data
US 2012/0055899 A1 Mar. 8, 2012

(30) Foreign Application Priority Data

May 13, 2009 (ID) .............................. P-00200900271

(51) Int. Cl.
*B65D 41/48* (2006.01)

(52) U.S. Cl.
USPC ......................................... 215/256; 215/254

(58) Field of Classification Search
USPC .......... 215/254, 256, 255, 305; 264/241, 268, 264/246, 275, 247, 255, 328.8; 222/541.5, 222/541.6, 153.05–153.07
See application file for complete search history.

(56) References Cited

U.S. PATENT DOCUMENTS

| | | | | | |
|---|---|---|---|---|---|
| 1,941,712 | A | * | 1/1934 | Ohta | 215/328 |
| 2,454,126 | A | * | 11/1948 | Bloomfield | 215/303 |
| 3,392,862 | A | * | 7/1968 | Faulstich | 215/254 |
| 3,927,784 | A | * | 12/1975 | Cochrane | 215/256 |
| 3,946,891 | A | * | 3/1976 | Picoy et al. | 215/256 |
| 4,029,231 | A | * | 6/1977 | Jonsson | 215/256 |
| 4,919,285 | A | * | 4/1990 | Roof et al. | 215/230 |
| 5,605,240 | A | * | 2/1997 | Guglielmini | 215/256 |
| 5,695,083 | A | | 12/1997 | Obadia | |
| 6,481,588 | B1 | * | 11/2002 | Wagner | 215/235 |
| 7,581,653 | B2 | * | 9/2009 | Perrin et al. | 215/254 |

FOREIGN PATENT DOCUMENTS

| | | |
|---|---|---|
| EP | 0060931 | 9/1982 |
| FR | 2752560 | 2/1998 |
| FR | 2775959 | 9/1999 |
| ID | S 0000928 B | 5/2009 |

OTHER PUBLICATIONS

Abstract of European Application No. EP 0060931.
Abstract of French Application No. FR 2752560.
Abstract of French Application No. FR 2775959.

* cited by examiner

*Primary Examiner* — J. Gregory Pickett
*Assistant Examiner* — Ernesto Grano
(74) *Attorney, Agent, or Firm* — Frost Brown Todd LLC

(57) ABSTRACT

A container lid intended to be used as a lid for any kind of container/bottle, and comprising an upper lid (1) and a bottom part (2) connected by a connecting part (5). The container lid is processed by multi-injection of multi-colors plastic technology to produce a container lid made of multi-materials. The connecting part (5) extends around the container lid and is adapted to be broken up to a stopper part (7) when a pulling part (4) is pulled. The container lid is intended for plastic bottles including bottled drinking water and/or flavored beverage bottles to prevent counterfeiting or imitating.

16 Claims, 2 Drawing Sheets

US 8,556,096 B2

CONTAINER LID HAVING A PULLING PART AND A BREAKABLE CONNECTING PART

TECHNICAL FIELD OF THE INVENTION

The present invention relates to a container lid, more specifically, the present invention relates to a container lid designed in such a way that it can function as a container cap that can be used for bottles, such as glass bottles, plastic bottles, including gallon bottles for Bottled Drinking Water and flavored beverage bottles, general beverage bottles and all other types of container/bottles.

BACKGROUND OF THE INVENTION

The container lid is commonly used to secure the contents of existing products within the container. It has been known that for a liquid product which is generally placed in a container in the form of bottles, and to prevent the liquid from spills then, it is needed that the lid should completely be locked and tightly sealed around the neck of the bottle so that if the bottle is in a state of tilted position the fluid within the liquid will not spill through the bottle cap.

To obtain a substantially strong closed container/bottle in order to seal and maintain lid seal on the container/bottle the inventor filed the present invention entitled "Container Lid of Multicolor Injection," which is an improvement to container lids/bottle of the prior art that can bind and seal the container lid/bottles tightly around the neck of bottle surface so the contents will not spill even if the bottle is in a state of tilted position and also the results of the present invention can be used for container/bottle with liquid contents of both small capacity and large capacity.

SUMMARY OF THE INVENTION

The purpose of the present invention is to overcome the problems exist in the prior arts, especially in a container/bottle. Among these problems are the counterfeiting and imitating of Bottled Drinking Water, for example the fact that one achieve to remove the lid of a bottle or a container without breaking the first opening indicating means in order to replace on a used container which have been refilled.

Container lid disclosed within the present invention is a container lid designed in such specific shape that it can be attached and opened easily, and will not leak when used.

The main purpose of the present invention is to provide a container lid that can be used as a closure for any kind of container/bottle consisting of an upper lid and bottom lid connected by a connector part, which is characterized in that the connector part that surrounds the container lid will break the lid up to a stopper part, when the puller part is pulled; the puller part is equipped with embossed lines and on the upper part of these embossed lines is provided with a hole that can has a water droplets shape or other shape; the puller equipped with the embossed lines serves to provide comfortable during pulling action; the puller part is equipped with embossed line and at the upper part of the embossed lines a hole is provided for accommodating of user's finger when pulling action is conducted; the puller will be drawn around the container lid to open the upper lid; the puller part is placed at one side of the container lid; the inside part of the container lid is equipped with a sealing which functions to prevent any leakage, the container lid can be used for single usage.

Another purpose of the present invention is to provide a container lid with high technology that can prevent leakage, more practical and efficient, especially for use as a lid of the container/bottle.

Still another purpose of the present invention is to obtain a container lid in accordance with the present invention that is made by multi-injection process technology that can produce the container lid with a multi color and can utilize multi-materials as High Density Polyethylene (HDPE) and low density polyethylene (LDPE) or mixture of HDPE and LDPE with a very good quality so as to produce a lid of container/bottle that can be relied upon during its use.

The above purposes and other benefits as well as more comprehensive understanding to the invention as the preferred embodiment will be further explained with reference to the drawings that accompany the present invention.

DETAILED DESCRIPTION OF THE INVENTION

Figure 1:
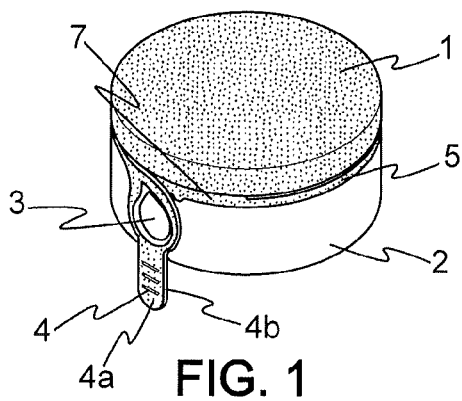
FIG. 1 is a perspective view of the container lid in accordance with the present invention.

The present invention will be fully described with reference to the accompanying drawings.

It is to be understood, however, that the present invention would not be limited by no means to the parts, arrangements and material makers that are not specifically described, and any change to the materials, variations, sizes and modifications can be made without departing from the spirits and scope described in the present invention.

Referring to FIGS. 1 to 7, it is shown a perspective view and the parts of the container lid in accordance with the present invention wherein the lid of the container/bottle in accordance with the present invention comprises two parts, an upper lid (1) and a lower lid (2) that is associated with the circular upper lid (1) by a connecting part (5) made of thin material, and the connecting part (5) together with the puller grip (4) which is hollow at its center (3) with the shape of water droplet, are joined with the middle part of lower body (2) of the container lid.

Therefore the lower part (2) is also circular and comprises the upper part of the puller grip (4). As it can been seen on the figures the puller grip (4) extends beyond the lower edge of the bottom part (2).

The inside of container lid is equipped with a seal (6) that serves to prevent leakage.

The container lid in accordance with the present invention will be mounted to a bottle in such a way that the lid is properly placed on the bottle orifice and subsequently is pressed downward on the bottle, so the lid will be associated with the orifice of the bottle neck through the hook (8) tightly and will not leak because the inner part of container lid has been equipped with seal (6).

The container lid in accordance with the present invention is made by multi-injection process technology that produces the container lid with a multi-colors and can utilize multi-materials as High Density Polyethylene (HDPE) and low density polyethylene (LDPE) or mixture of HDPE and LDPE with a very good quality so as to produce a lid of container/bottle that can be relied upon during its use.

In particular with a color representation of the lid it would be clear that in the depicted embodiment the lid is made of two different materials having two different colors. From the cross-section view of FIG. 7, the two different materials appear from the hatching.

Figure 2:
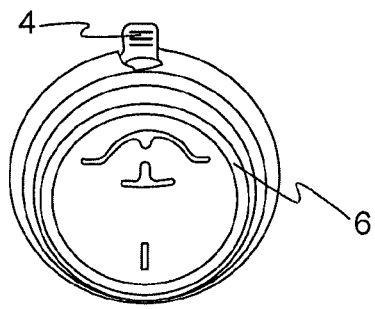
FIG. 2 is a bottom perspective view of the container lid in accordance with the present invention.
Figure 3:
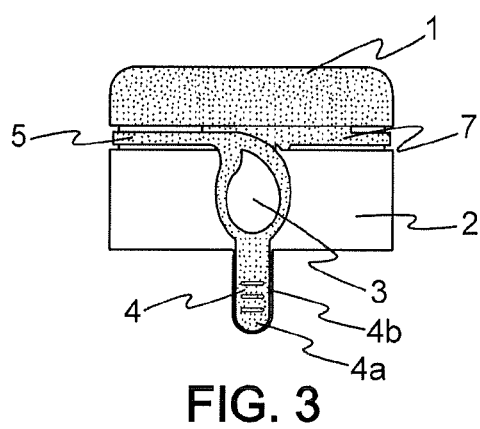
FIG. 3 is a front view of the container lid in accordance with the present invention.
Figure 4:
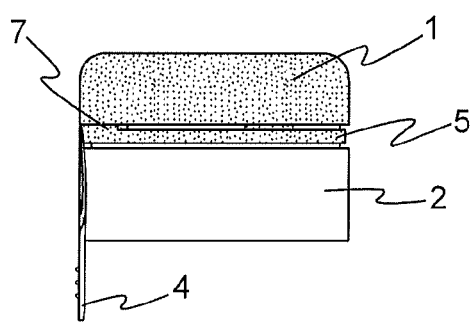
FIG. 4 is a left side view of the container lid in accordance with the present invention.
Figure 5:
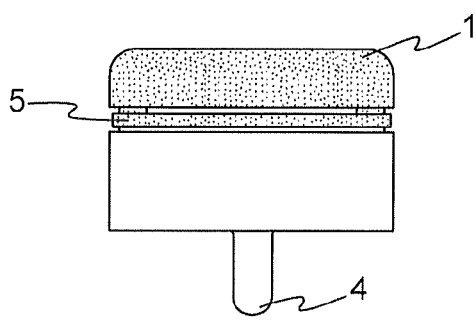
FIG. 5 is a rear view of the container lid in accordance with the present invention.
Figure 6:
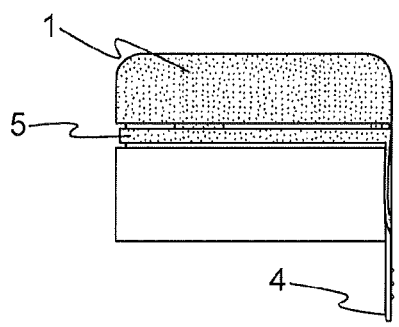
FIG. 6 is a right side view of the container lid in accordance with the present invention.

The upper lid (1) has an external layer of a first material which is Low Density Polyethylene (LDPE) and an inner layer of High Density Polyethylene (HDPE). For example the LDPE could be colored in white and the HDPE in dark blue. Since the cap is manufactured by a multi-injection process, in fact a bi-injection process for the exemplary embodiment, the two layers are stuck together. Some apertures, visible on FIG. 2, are made through the inner layer and filled with the first material in order guarantee their assembly.

Figure 7:
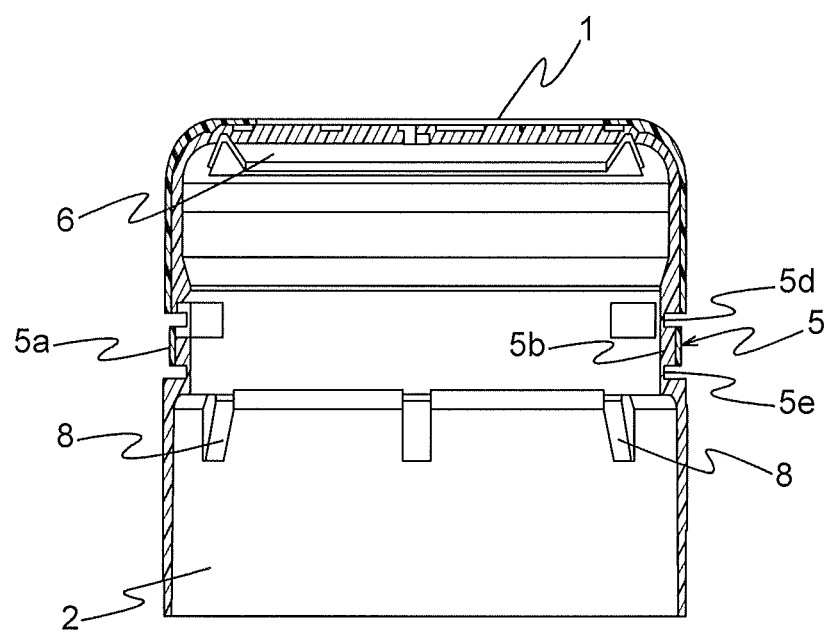
FIG. 7 is a cross-section view of the rear half-portion of the container lid in accordance with the present invention.

As it could be also seen on FIG. 7, the connecting part (5) has an inner layer (5b) made of the second material (HDPE) and an external layer (5a) made of the second material (LDPE), the inner layer being thicker.

Still referring to FIG. 7, it should be noted that the connecting part is connected to the upper lid (1) by a thin upper web (5d) that clearly creates a weakness zone which would guide a tearing action. The upper web is mainly made of the second material (HDPE) but comprises short portions made of the first material (LDPE). These short portions appear with a rectangular shape on FIGS. 4-6 and additionally in cross-section on FIG. 7.

The connecting part (5) has similarly a thin lower web (5e) forming a connection to the lower lid (2), but without portion made of the first material (LDPE).

The upper and lower web (5d, 5e) form a continuous connection between the upper and the lower lid (1, 2). That prevent the top part of the bottle, notably above the hook (8), to be soiled. Continuous web appear more advantageous against attempts to tamper the lid than frangible bridges, notably by welding them again.

Further ways to open the container lid in accordance with the present invention is by pulling the puller grip (4) forward and/or inserting a finger into the hole (3), and subsequently to pull it circularly around the container lid during the time of pulling action is applied, the connecting part (5) will be broken and the pulling action will be ended at a stopper part (7), thereby the container lid has been opened by breaking the connecting part (5) and the fluid inside the bottle can be poured. The stopper part is a circumferential portion between the upper and bottom lids (1, 2) which has the same thickness as them.

The container lid according to the present invention can be used only for a single usage because the connecting part has been broken, however it is still possible to use it furthermore even when the connecting part (5) has been broken because the upper lid (1) may also be retained to the edge of the bottle hole, but the safety is not guaranteed anymore because the connecting part (5) has been broken, so users, of course, know that the lid has been opened. The inventors realized that the use of two colors and of a multi-injection process improve substantially the anti-counterfeiting effect of the lid. First the users seem to detect more readily a defect in a two color lid. Secondly, attempts to weld or to glue a two colors plastic device tend to creates burrs and flashes easily viewable by the users.

The fact of using two materials (LDPE and HDPE) improves the operability and reliability of the lid. As known the LDPE is more resilient that the HDPE. This feature is used in a smart way in the design of the lid according the invention and is supposed to explain the satisfactory results obtained during tests. It is supposed that the bottom lid (2) made of HDPE is sufficiently rigid with that material to prevent elastic extension of its diameter to pass over the retaining means of the bottle. The HDPE also provide structural strength to the connecting part (5) and the upper lid (1). However the layer (5a) of LDPE is supposed to provide the connecting part (5) with a higher resistance to deformation and tensile stress. The same apply for the pulling grip (4) which is formed essentially of the first material (LDPE) on its outer face (4a) and has a thick layer of the second material (4b) on its rear face (4b). The double layers of bi-injected materials certainly improve the capability of these elements to be pulled without breaking.

A feature of the present invention is embodied on the pulling part (4) which is equipped with embossed lines so that if any pulling action is made by holding the pulling part (4) there will not be slippery and they provide comfort for pulling, and the pulling part (4) is also equipped with a hole (3) that allows to insert one's finger into the hole (3) and subsequently, to pulled it circularly so that one can easily open the container lid.

From the explanation above it is clear that the present invention applied by the inventors in the form of a container lid in accordance with the present invention is highly feasible for use by any people because it is simple and practical in use.

Accordingly, the present invention has been fully described in reference to the above drawings which are intended to best describe the subject of the present invention. The description and the drawings that accompany the present invention should not be construed as a limitation to the subject invention. All parts on the container lid in accordance with the present invention are designed to use high technology so that the system resulted is a bottle cap of an "anti-counterfeited" type and in use the present invention actually presents an improvement, especially on a container lid that can be used for all needs.

The invention claimed is:

1. A container lid intended to be used as a lid for any kind of container/bottle, and comprising:
    a bottom part;
    an upper lid;
    a connecting part, said upper lid and said bottom part connected by the connecting part;
    a pulling part distinct from the bottom part and fixed to the connecting part; and
    a stopper part;
wherein said container lid is processed by multi-injection of multi-colors plastic technology to produce a container lid made of multi-materials,
wherein the connecting part extends around the container lid and is adapted to be broken up to the stopper part when the pulling part is pulled, said container lid being intended for plastic bottles to prevent counterfeiting or imitating,
and wherein the pulling part comprises a first plastic material, the bottom part comprising a second plastic material that is less resilient than the first plastic material.

2. The container lid according to claim 1, wherein the pulling part is equipped with embossed lines, and wherein a part above the embossed lines is provided with a hole in the shape of a droplet of water.

3. The container lid according to claim 1, wherein the pulling part is equipped with reliefs which provide comfort and gripping during a pulling action.

4. The container lid according to claim 1, wherein the pulling part is provided with a hole designed for allowing insertion of user's finger and a pulling action.

5. The container lid according to claim 1, wherein the pulling part is pulled circularly around the container lid to open the upper lid.

6. The container lid according to claim 1, wherein the inside of the container lid is equipped with a seal for preventing leakage.

7. The container lid according to claim 1, wherein the container lid is designed to enable a single usage.

8. The container lid according to claim 1, wherein the pulling part is formed as an extension of the connecting part, wherein the pulling part and the connecting part comprise each an outer layer of said first plastic material and an inner layer of said second plastic material, and wherein the annular bottom part is essentially made of the second material and is connected to the inner layer of the connecting part.

9. The container lid according to claim 8, wherein the first material comprises essentially LDPE and the second material comprises essentially HDPE.

10. The container lid according to claim 8, wherein the first and the second plastic materials have two different colors.

11. The container lid according to claim 1, wherein the pulling part extends over the bottom part and beyond a lower edge of said bottom part, said pulling part being torn from the bottom part by the pulling action, whereby the bottom part is broken.

12. The container lid according to claim 8, wherein the connecting part is connected to each of the upper lid and the bottom part respectively by a thin continuous web.

13. The container lid according to claim 12, wherein one of the continuous webs comprises portions made of the first plastic material and other portion made of the second plastic material, said one web being torn during the pulling action.

14. A bottle lid comprising:
a bottom part having a lower edge;
an upper lid;
a connecting part, said upper lid and said bottom part connected by the connecting part;
a pulling part distinct from the bottom part and fixed at a first end of the connecting part, the pulling part being provided with a hole therein, the hole being adjacent to said first end of the connecting part; and
a stopper part, the connecting part having a second end fixed to the stopper part;
wherein said bottle lid is processed by multi-injection so as to include at least two different plastic materials,
and wherein said connecting part extends around the container lid and is adapted to be broken up to the stopper part when the pulling part is pulled, the pulling part extending over the bottom part and beyond the lower edge of said bottom part, said pulling part being torn from the bottom part when the pulling part is pulled.

15. The bottle lid according to claim 14, wherein said hole is arranged above said lower edge.

16. The bottle lid according to claim 14, wherein the stopper part extends circumferentially between the bottom part and the upper lid, said stopper part and said upper lid having the same thickness.

\* \* \* \* \*